United States Patent [19]
Frey et al.

[11] Patent Number: 5,749,984
[45] Date of Patent: May 12, 1998

[54] TIRE MONITORING SYSTEM AND METHOD

[75] Inventors: Normam Walter Frey, Laurens; Robert Jeffery Albertson, Belton, both of S.C.

[73] Assignee: Michelin Recherche et Technique S.A., Granges-Paccot, Switzerland

[21] Appl. No.: 586,015

[22] Filed: Dec. 29, 1995

[51] Int. Cl.$^6$ ............... B60C 23/02; B60C 23/06; B60R 16/02

[52] U.S. Cl. .............. 152/415; 152/152.1; 73/146.2; 73/488; 73/514.34; 340/444; 364/424.03; 364/424.04

[58] Field of Search .................. 152/415, 416, 152/417, 152.1; 73/493, 494, 491, 514.34, 146.2, 146.4, 146.5, 488; 340/441, 442, 443, 444; 364/424.03, 424.04

[56] References Cited

U.S. PATENT DOCUMENTS

| | | | |
|---|---|---|---|
| 4,237,728 | 12/1980 | Betts et al. | 73/146.5 |
| 4,246,567 | 1/1981 | Miller | 340/442 |
| 4,862,486 | 8/1989 | Wing et al. | 377/16 |
| 4,953,393 | 9/1990 | Galasko et al. | 73/146.5 |
| 5,218,861 | 6/1993 | Brown et al. | 73/146.5 |
| 5,247,831 | 9/1993 | Fioravanti | 73/146 X |
| 5,385,753 | 1/1995 | Hu et al. | 427/215 |

FOREIGN PATENT DOCUMENTS

| | | |
|---|---|---|
| 1085228A | 4/1993 | China . |
| 0639472A1 | 2/1995 | European Pat. Off. . |
| 0643117A1 | 3/1995 | European Pat. Off. . |
| 5213018 | 8/1993 | Japan . |
| 5221208 | 8/1993 | Japan . |
| 6166308 | 6/1994 | Japan . |
| 6183231 | 7/1994 | Japan . |

*Primary Examiner*—Michael W. Ball
*Assistant Examiner*—Francis J. Lorin
*Attorney, Agent, or Firm*—Alan A. Csontos

[57] ABSTRACT

A method and system for monitoring and measuring the amount of deflection of a pneumatic tire wherein said monitoring system in the tire detects tire sidewall deflection by measuring the length of the tire contact patch area relative to the total circumference of the tire. The embedded sensor device generates a signal which varies as it passes through the tire contact patch within the tire on a moving vehicle. If the vehicle is moving at a constant speed, the ratio of time which the sensor spends inside the contact patch to the time the sensor spends outside the contact patch is proportional to tire deflection. Sensor electrical signals are digitized and counted to determine deflection, tire speed and the number of tire revolutions to improve performance of both the tire and the vehicle.

17 Claims, 4 Drawing Sheets

TIRE MONITORING SYSTEM AND METHOD

FIELD OF INVENTION

The present invention relates to pneumatic tires for vehicles and in particular to a method and apparatus for monitoring the deflection and rotational speed of tires. The processing of electrical signals from a tire sensor device to generate total tire revolutions, tire deflection and speed data for tracking the tire's useful life provides information to the vehicle's operator to warn against tires operating out of their acceptable deflection/speed regime. Operational limits due to overloading or underinflation are input into a central tire inflation system to optimize tire pressures for given load, speed and vehicle operating conditions.

BACKGROUND OF THE INVENTION

The benefits of using proper inflation pressures in tires are many. With proper tire inflation pressures one can optimize tread wear, rolling resistance, road hazard resistance, casing life and traction of the tire and handling of the vehicle. Inflation systems for vehicles are known in the art. One problem is in providing an accurate measure of the changing load on the tires to determine what inflation pressure is required for controlling tire deflections. Proper tire deflections are more critical for good tire performance than having a predetermined inflation pressure. Tire deflection is a tire parameter which is a function of both tire load and tire inflation pressure at the same time. In addition, tire deflection is directly related to the length of the contact area between the tread surface of the tire and the ground surface. If this contact length can be controlled by changing the inflation pressure, the tire can have optimum performance as discussed above.

One method known to determine tire inflation pressures depends upon direct actuation of a pressure sensor or transducer. Direct reading pressure sensors generate analog signals which must be accurate representations of the pressure; as disclosed in U.S. Pat. No. 5,218,861 an European Patent No. 639,472. Pressure transducer devices are attached to the inside of the tire and pressure signals are transmitted by a transponder to the receiving device exterior to the tire for future adjustments of inflation pressure. These systems do not account for the changing loads on the tire, such as a truck tire.

Indirect methods for detecting tire inflation pressures are disclosed in Japanese Patent Nos. JP5-221208, JP6-166308 and JP5-213018 and U.S. Pat. No. 4,953,393. Wheel speed sensors are used in JP208 and JP018 and radial vibration frequencies are used in JP231 to determine when a tire has had a change in inflation pressure. In U.S. Pat. No. 4,953,393, a coil component has been added inside the tire to detect a change in the radial vibration frequency of the tire. These indirect methods are used for detecting underinflation conditions of the tire.

Another important parameter in optimum tire performance is the number of revolutions per mile experienced by a tire and the total number of revolutions during the life of the tire. Revolutions per mile are related to the rolling radius which is directly proportional to the tire's deflection. Speed of the vehicle's tire is also directly proportional to the number of revolutions per unit of time and its rolling radius. Previous methods to record automotive and truck tire revolutions have used piezoelectric sensors mounted in such a manner as to measure a change in stress at given section of tire, usually in the sidewall area. These type sensor devices are disclosed in U.S. Pat. Nos. 4,237,238; 4,246,567; and 4,862,486. In U.S. Pat. No. 4,862,486 the sensor detects each revolution of the tire by flexing and a counter device records the number of times the sensor has flexed. In U.S. Pat. No. 4,246,567 a piezoelectric crystal is contacted by an expansible member in response to elevated temperatures. A tire deflection also provides contact with the crystal giving an output signal to represent tire failures. In U.S. Pat. No. 4,237,238 a piezoelectric transducer is deflected with each revolution of the tire when the tire profile is low. These sensors signals are monitored directly to determine revolutions and deflection of the tire. Because large deflections occur in the sidewall area, these sensor methods are subject to large cyclic stress and may be prone to fatigue failures, especially in truck tires. In addition, these sensors may impart objectionable variations in radial tire forces, causing unacceptable levels of noise, vibration and harshness, especially in passenger car tires. The most direct measure of the correct inflation pressure for optimum performance of the tire is to monitor the footprint or contact patch of the tire to ground surface contact area. The footprint width remains essentially constant in straight ahead driving but the length of the contact area changes. Monitoring of the footprint is disclosed by the system and method of U.S. Pat. No. 5,247,831. This patent discloses how to monitor some behavior parameters of the tire's footprint to generate signals to control the movement or handling of the vehicle. This system uses the tire to optimize vehicle performance and does not necessarily optimize the tire's performance; such as tire wear.

There is a need to monitor the tire's footprint to optimize both the tire's performance and the vehicle's performance. There is an increased need to have a system and a method for a truck type vehicle which can frequently adjust its tire pressure in response to the cargo carried. There is a great difference between the empty truck weight and the fully laden truck weight. The difference is the cargo capacity and designers try to maximize truck cargo capacity by reducing empty truck weight. The operational truck must have tire inflation pressures set for the maximum load anticipated for optimum loaded truck performance. Therefore, when a truck is traveling at less than maximum load, the tires are overinflated. Most trucks are fully laden less than half of the time so that much of the time their tires are overinflated. In addition, if air pressure maintenance is infrequent tires are potentially underinflated.

In particular, the need is to make adjustment in tire inflation pressure to control the length of the contact area of the tire on the ground surface to achieve a proper contact length. The contact width is essentially constant for a tire. The contact length is directly related to the deflection of the tire measured by the difference in the rolling radius and the free radius of the rolling tire not in contact with the ground surface. Tire performance can be improved by the controlling contact length using inflation pressures.

Accordingly, an object of this invention is to provide a tire monitoring system which directly measures the length of the contact between the tire and the ground surface. The contact patch length is adjusted by changing the inflation pressure within the tire.

Another object of the present invention is to position a sensor device in the outer circumference of the tire (summit area) where bending stresses are moderate and to position an electrical package within the tire where bending stresses are reduced (bead area). The position of the electrical package to increase the life-cycle expectancy of the components and circuits in the electrical package and to reduce the radial tire force imbalances.

A further object is to utilize the technique of measuring tire deflection to obtain a total number of revolutions to provide a improved history of the tire's usage for improving the life-cycle fatigue of the tire's carcass.

An additional object of the present invention is to use sensor device electrical signals to obtain the number of tire revolutions over a period of time to compute vehicle speed values to be used to help optimize tire performance.

Yet another object of the invention is to provide a tire monitoring system in which those electrical components which have limited cyclic fatigue life are positioned in a low deformation area within the tire.

An added object of the invention is to process electrical signals from the sensor device in such a way that the signals can have a relatively inferior signal to noise ratio without degrading the parameters used in monitoring the tire's performance.

A further added object of the invention is to have the ability to monitor a single tire without necessary information available from the other tires on the vehicle.

SUMMARY OF THE INVENTION

The above objects are accomplished according to the present invention by a tire monitoring system and method as disclosed herein.

The present invention is for a tire mounted on a wheel of a vehicle having a tread portion that contacts a ground surface over a tread contact surface during rolling of the tire under nominal operating conditions of vehicle load and speed. The invention is a tire monitoring system comprising the following components having the functions described. A reference point on said tread contact surface of said tread portion defines a circumferential location on said tread portion. A sensor device located within the tire is associated with the reference point for generating first electrical signals when the reference point is included within the tread contact length, and for generating second electrical signals when said reference point is not within said tread contact length. An electronics package is remote from the sensor device within the tire for energizing the sensor device and for receiving the first and second electrical signals from the sensor device. A digital monitoring device of the electronics package is for interrogating the first and second electrical signals at a sampling frequency sufficient to obtain a first plurality of electrical pulses each revolution cycle of said tire and a second plurality of digital pulses each revolution cycle of the tire; corresponding to the first and second electrical signals respectfully. A digital logic circuit of the electronics package is for determining a sum of the number of the first and second electrical pulses and an ratio of the number of first electrical pulses to the number of second electrical pulses each revolution cycle of the tire. A memory device of the electronics package is for counting and storing the sum of electrical pulses and the ratio of said electrical pulses. An operator display device is for an operator of the vehicle to monitor performance of the tire. Digitized transceiver devices are for transmitting and receiving a plurality of the sum values and a plurality of the ratio values, corresponding to a tire monitoring time, from the memory device of the tire to the operator display device of the vehicle. An on-board computer is associated with the operator display device to calculate and display at least tire deflection values using the plurality of ratio values, wherein said tire can be monitored for proper inflation pressures to provide a predetermined tire deflection.

In another embodiment the on board computer calculates and displays the number of revolutions of the tire and the vehicle speed using the plurality of sum values. That is, said on-board computer further computes and displays a speed of the vehicle using the plurality of sum values to obtain the number of tire revolutions over the monitoring time, wherein the tire can be further monitored to obtain an improved tire deflection consistent with an improved life cycle performance of the tire.

In a further embodiment of the invention a method is provided for monitoring a tire mounted on a wheel of a vehicle having a tread portion that contacts a ground surface over a tread contact surface during rolling of the tire under nominal operating conditions of vehicle load and speed. The method comprises the following steps: (1) Establishing a reference point on the tread contact surface which contacts a ground surface each revolution of the tire; (2) Providing a sensor device within the tire associated with the reference point for generating electrical signals; (3) Generating first electrical signals using the sensor device when said reference point is contacting the ground surface over a contact length; (4) Generating second electrical signals using the sensor device when the reference point is not within said contact length; (5) Providing an electrical package removed from the sensor device within the tire for energizing the sensor device and for receiving first and second electrical signals from the sensor device; (6) Interrogating the first and second electrical signals at a predetermined sampling frequency over a monitoring time using a digital monitoring device of the electrical package; (7) Generating first and second electrical pulses using the digital monitoring device to corresponding to the first and second electrical signals respectfully; (8) Providing a digital counting logic circuit of the electrical package for generating the number of first and second electrical pulses respectively each revolution of the tire using the sampling frequency; (9) Determining a sum of the number of first and second electrical clock pulses each revolution of the tire using the logic circuit; (10) Determining a ratio of the number of first electrical pulses to the number of second electrical pulses each revolution using the logic circuit; (11) Storing the sum and the ratio in a pulse memory portion of said electronics package for each revolution of the tire; (12) Transmitting a plurality of the sum and the ratio values for a plurality of revolutions, consistent with the tire monitoring time, from the pulse memory portion to a receiver portion of an operator display device of the vehicle; (13) Providing an on-board computer associated with the operator display device for calculating and displaying at least tire deflection values using the plurality of ratio values; and (14) Monitoring the tire deflection values using the operator display device and adjusting tire inflation pressure values to obtaining a predetermined tire deflection value.

BRIEF DESCRIPTION OF THE DRAWINGS

The construction designed to carry out the invention will hereinafter be described, together with other features thereof.

The invention will be more readily understood from a reading of the following specification and by a reference to the accompanying drawings forming a part thereof, wherein an example of the invention is shown and wherein.

DESCRIPTION OF THE PREFERRED EMBODIMENT

Referring now in more detail to the drawings, the invention will now be described in more detail.

Using a sensor device which varies its output as a particular point on the circumference of the tire enters and exits the contact patch lends itself to digital values with respect to time. Tire deflection can then be calculated using the ratio of time spent in the contact patch to time spent traveling around the circumference of the tire. A digitized electrical signal also provides the number of tire rotations per unit of time (rotational frequency) as well as the total number of tire revolutions over the life of the tire. Using tire deflection and the tire rotational frequency, the tire speed can be calculated and monitored to verify tire operations within an acceptable load, speed and life cycle regime. In addition, tire deflection/speed/revolution measurements can be made using a relatively short monitoring time which can be repeated every few minutes.

Tire deflection and speed can be combined with a count of total tire revolutions to provide a more useful measure of tire carcass fatigue life using deflection, speed and time or deflection, speed and revolution count relationships. Additionally, this sensor may also be used to measure the severity of the tire operating environment by developing algorithms which convert the magnitude and frequency of load, pressure and speed oscillations to the severity of tire service.

The length of the contact patch varies in relation to the inflation pressure of a pneumatic tire under a constant vehicle load in that, to an extent, increasing the inflation pressure shortens the contact patch. The total outer tread circumference of a loaded tire in contact with the ground surface has a length fixed by the length of the relatively rigid belt plies below the tire's tread portion. The outer tread circumference has a contact patch portion and a free portion not making contact with a ground surface. The total length of these two portions when added together remains essentially constant with a changing inflation pressure within the tire and/or when changing the load on the tire. However, the relative length of these two portions changes. The contact patch is that portion of the tire tread circumference which is in contact with the ground surface. The load on a pneumatic tire at a constant inflation pressure changes the length of the tire's contact patch in that, to an extent, increasing the load lengthens the contact patch. The length of the contact patch is further lengthened by decreasing the inflation pressure.

Figure 1A:
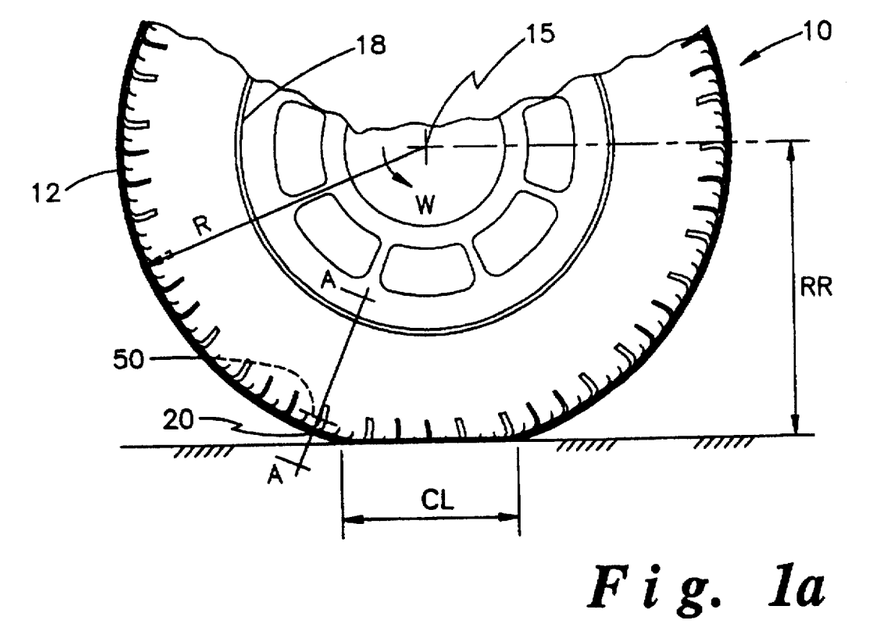
FIG. 1a is a side elevation view of a tire showing the general location of a sensor device within a tire adjacent to a reference point on the contact surface of the tire.

The illustration of FIG. 1a shows the tire 10 in contact with a ground surface 30. A contact length CL of the contact area 13 must fall within an acceptable range for the pneumatic tire to function properly. The larger the contact length the more the tire is being deflected. For optimal performance, contact length should be adjusted by varying inflation pressure for a given load and tire rotational speed W conditions.

The inflation pressure within a loaded tire is inversely proportional to the percentage of time that a reference point 20 on the outer surface 12 of the tire tread spends in contact with the ground surface 30. A relationship can be formulated as follows:

$$\text{INFLATION PRESSURE} = K \times Tc/Tp \times \text{LOAD}$$

where Tc is the period of time a reference point on the tread's circumference is free from contact with a ground surface;

Tp is the period of time a reference point on the tread's circumference is in contact with a ground surface;

Tc/Tp is a ratio as further discussed in this description; and

K is a constant of proportionality for the tire used and is a nonlinear function of the load and pressure.

Increasing the load transferred through the rim 18 or decreasing the inflation pressure results in an increased percentage of the time that the reference point 20 on the surface of the tire's tread spends in contact with the ground surface during one revolution of the tire.

A sensor device 50 used to provide a signal for calculating tire contact patch length TL can comprise one of several different types, including but not limited to:

1) a piezoelectric polymer, which consists of a piece of polymer which was manufactured in such a way as to contain aligned dipolar molecules which cause an electrical charge potential when the polymer is strained;

2) a photorestrictive fiber optic cable connecting a light emitting diode and a photocell, which modulates the amount of light received by the photocell when the fiber optic cable is bent normal to its longitudinal axis;

3) a variable capacitor made from aluminized mylar, whose capacitance changes as a function of pressure; and 4) a variable inductor sensor, consisting of an inductive coil whose inductance changes or whose coupling between two inductive coils changes as a result of sensor strain.

Figure 3:
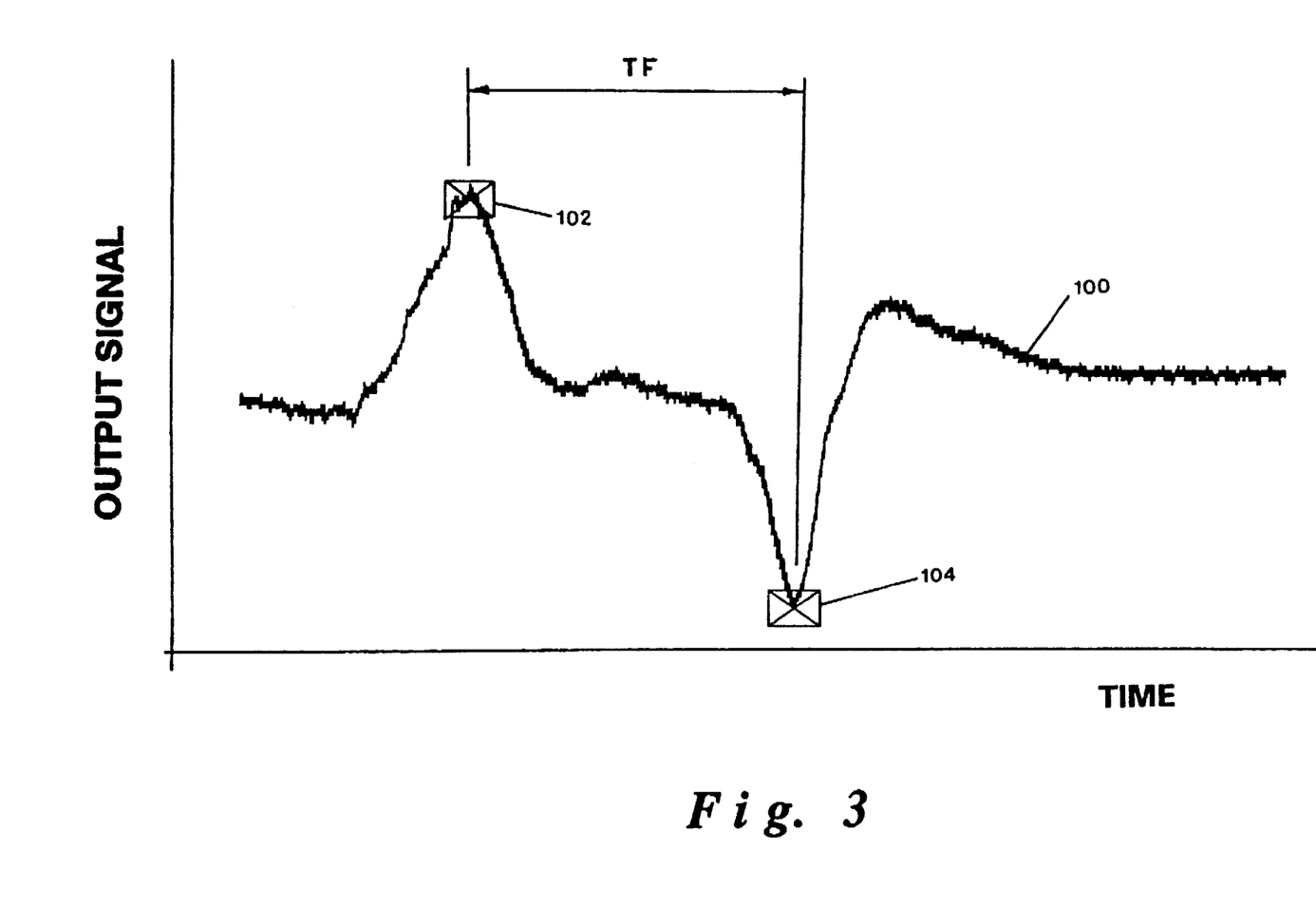
FIG. 3 is a plot of an output electrical signal from a piezoelectric polymer sensor as a function of time, the sensor being on the inside surface of the tire, as shown in FIG. 1b, as the tire goes through contact with a ground surface.

The preferred embodiment of the sensor device consists of the piezoelectric polymer which strains as a result of the tread bending or flexing as it enters and exits the contact patch. FIG. 3 is a diagram of an exemplary electronic signal curve 100 which may be obtained from a sensor device of the above types for lightly as well as heavily deflected tires. There are large deformations of the sensor device as the reference point enters contact with the ground surface. The strain of these first deformations produces an electrical signal having a maximum value 102 followed by a minimum value 104 before the tread surface becomes flat on the ground surface 30. The characteristic time period TF between maximum and minimum signal values corresponds to a characteristic frequency of the tire. As the reference point leaves the contact area 13 the sensor device is again strained and a second deformation produces another electrical signal having another maximum value and another minimum value. The electrical signal as the reference point exits the contact patch is essentially the same as that illustrated in FIG. 3. The first and second deformations of the sensor device as the reference point enters and exits the contact patch defines very well the contact length CL (FIG. 1a). The evolution of TF for a known load, speed and pressure is also an indication of the tire's wear.

Figure 1B:
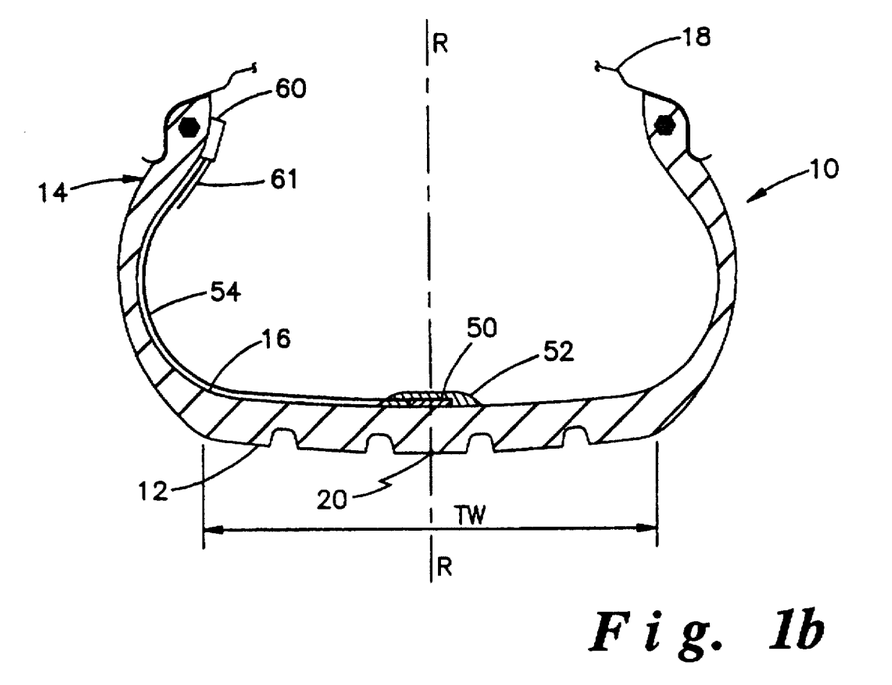
FIG. 1b is a section through the tire along line A—A in FIG. 1a showing the preferred sensor and electrical package locations.

The position of the sensor device within the tire is critical to the proper generation of electrical signals. A tire crosssection taken along line A—A in FIG. 1a is illustrated in FIG. 1b. The sensor device 50 is positioned near the radial plane R—R of the tire on an inside surface 16 of the tire 10. Preferably the sensor device 50 is protected by a rubber patch 52 on the inside surface 16 of the tire. The reference point 20 is adjacent the sensor device on the external surface 12 of the tire's tread at the radial plane. Sensor device electrical signals are monitored as disclosed in the following discussions.

Figure 2:
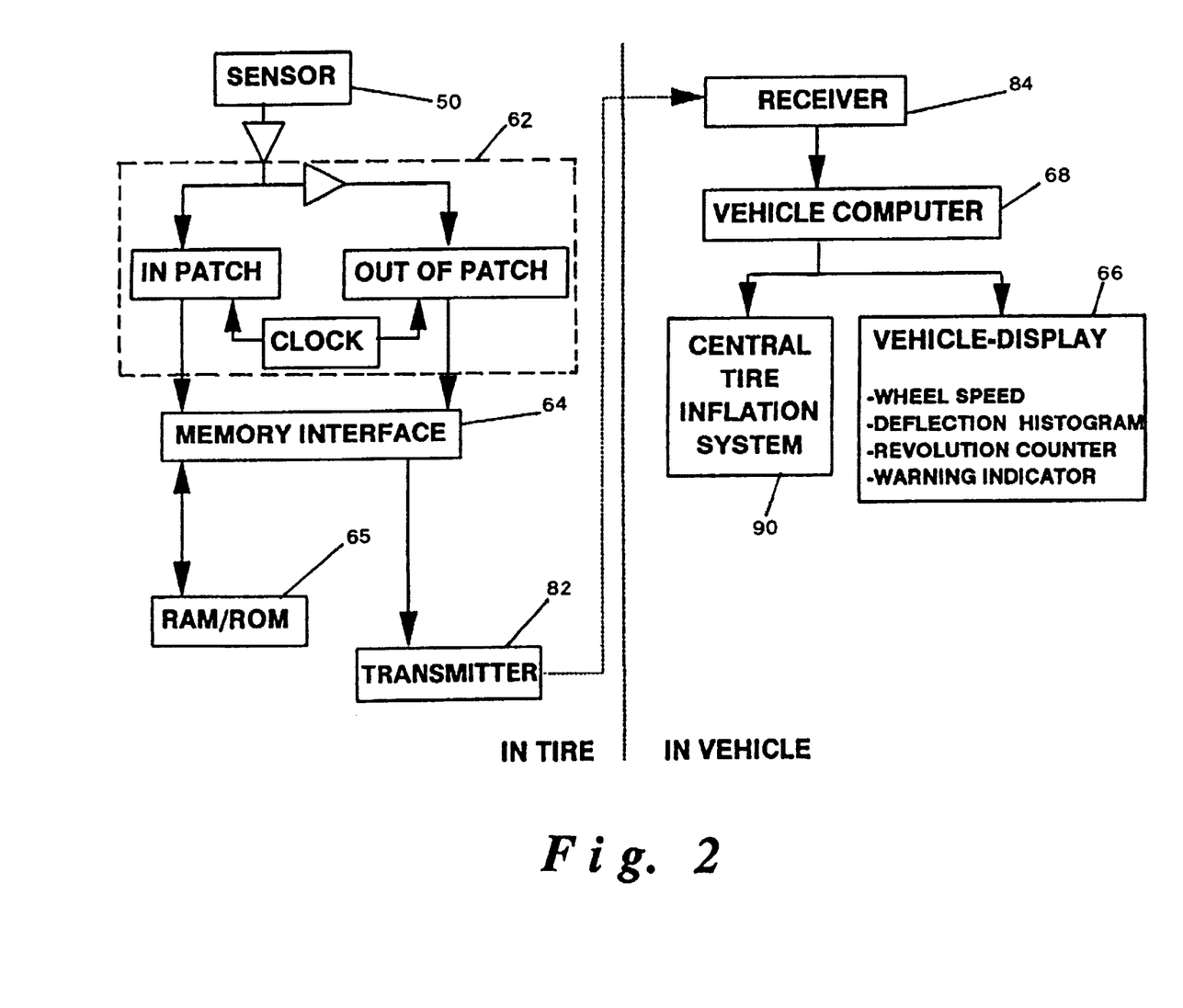
FIG. 2 is a general block diagram of the monitoring system used to carry out this invention in accordance with the description of preferred embodiment.

In FIG. 2 a simplified block diagram of the tire monitoring system is illustrated in accordance with the preferred embodiments of this invention. FIG. 2 shows the general electronic requirements for electrical signal conditioning, transmission, and processing to carry out this invention. As the sensor device 20 strains, the piezoelectric polymer of the sensor device generates a continuous electrical signal which can be amplified and converted to digital electrical pulses by a digital monitoring device 62. A logic circuit of the monitoring device monitors the electrical signals from the sensor device to define first and second electrical signals. First electrical signals are generated when the reference point 20 is not contained within the contact area 13. Second electrical signals are generated when the reference point is contained within the contact area.

The digital monitoring device further includes a digital clock device and counting circuit to provide a system monitoring time and frequency. First and second electrical signals are converted to first and second electrical clock pulses respectfully. Electrical clock pulses are generated in accordance with a monitoring frequency to give a plurality of pulses per revolution of the tire. Electrical pulses have a magnitude difference only as required to distinguish the first electrical pulses from the second electrical pulses. The electrical pulses are used as input into a digital counting circuit and the logic circuit of the monitoring device. The digital counting circuit uses the converted sensor electrical pulses to count the number of revolutions which occur for any given monitoring time period and the number of first and second electrical pulses each revolution of the tire. The digital logic circuit uses the conditioned first and second electrical pulses and the digital clock circuit to calculate the ratio of the time that the sensor device spends in the contact patch to the time that the sensor spends outside the contact patch. This ratio is proportional to the tire deflection. In addition, the digital logic circuit will provide the time for each tire revolution, yielding the tire's angular velocity (wheel speed).

Information from the digital logic circuit and the counter values from the digital clock counter circuit are recorded by an interface memory device 64 and stored in random access memory (ROM) 65. This information is periodically transmitted by a passive radio frequency (RF) transceiver when needed. The transceiver has a transmitter 82 within the tire and a receiver 84 within the vehicle. The passive RF transceiver would only transmit when activated by a RF interrogation signal external to the tire. This affords the in-tire passive RF transceiver minimum power consumption. This allows the electronic package and the sensor device to be powered by a long-life battery or a rechargeable battery which can preferably be charged by the motion of the tire.

The electronics package, including the digital monitoring device 62, plus the memory device 64, the ROM 65 and the transmitter 82 may contain electrical components which have a low tolerance to the cyclic stress and strain of the rotating tire. These components are positioned near the bead area 14 of the tire as illustrated in FIG. 1b. The bead area provides a stable environment to limit cyclic fatigue of these components remote from the sensor device. A lead wire 54 electrically connects the sensor device with these low lifecycle components. Other connection means are also within the scope of this invention, including wireless connections. An antenna 61 for radio frequency transmissions may also be positioned near the bead area 14.

Figure 4:
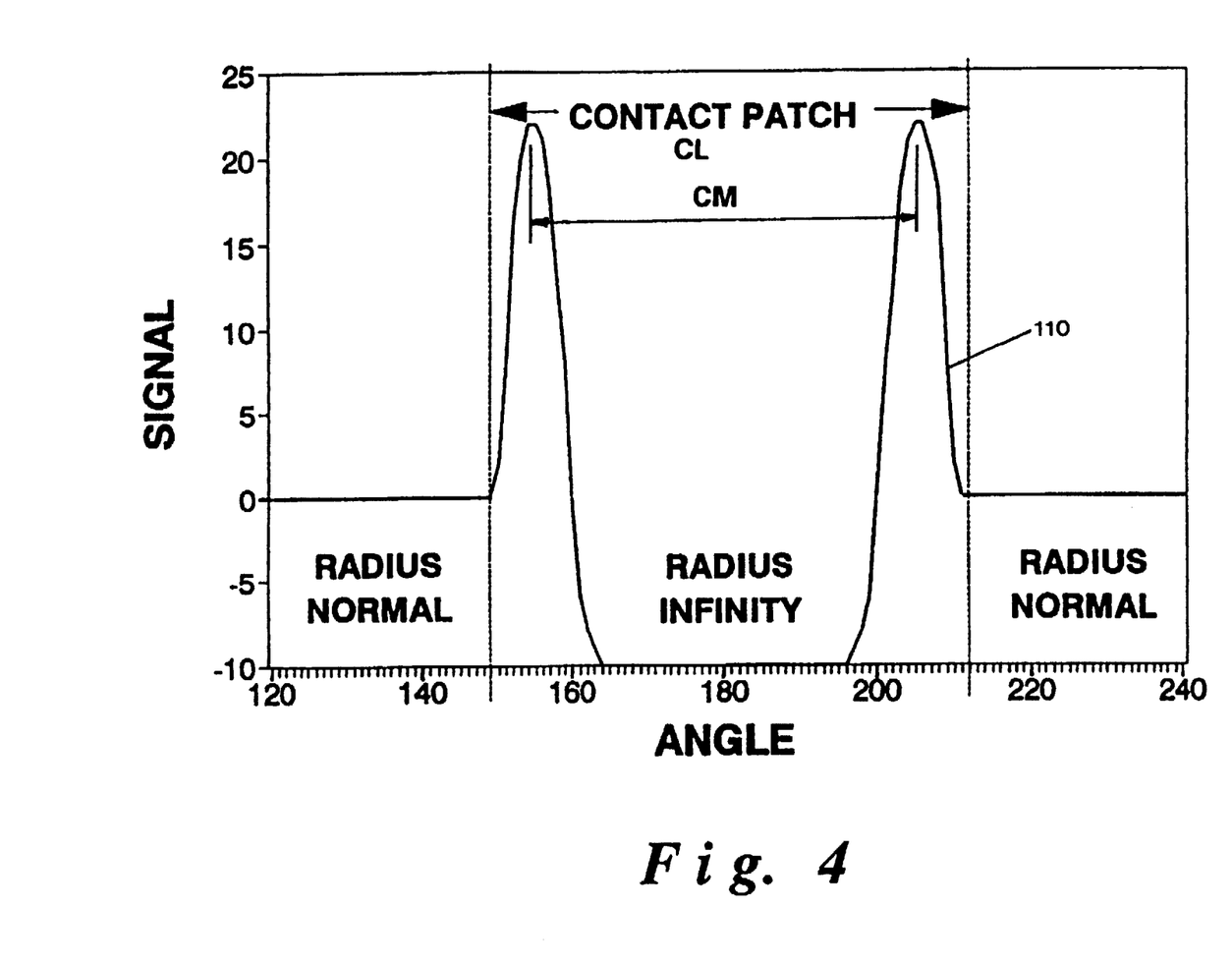
FIG. 4 is a plot of a typical output electrical signals from a piezoelectric sensor as a function of time as the sensor passes through the contact patch.

The illustration of FIG. 4 shows a generalized plot of the sensor device electrical signal as a function of the angle around the tire. The cure 110 representing the electrical signal has one set of values when the reference point is with the contact patch or area and another set of values when the reference point is in a angular location where the tire has a normal radius. The normal radius corresponds to the reference point not being in the contact area. The zero angular reference location is at the top of the rolling tire with the center of the contact patch being at 180 degrees. In this example, the contact is between 149 degrees and 212 degrees. The percentage of the tire's circumference in the contact patch is 100×(212−149)/360=18 percent of the total circumference of the tire. This percentage is very sensitive to the tire's deflection. The contact patch length CL is somewhat larger than the peak to peak distance CM of the electrical signal 110. The relationship between CL and CM can be obtained and stored in the memory device for different tires to be used in determining an accurate contact length in obtaining an optimum percentage or ratio.

In another embodiment of the present system and method the electrical signals from the sensor device can be processed by a frequency processing circuit within the electronics package to determine a characteristic frequency of the tire in use. For example, this may be a wheel hop frequency or a radial natural resonant frequency of the tire. This characteristic frequency can provide an additional system parameter to be used to determine what part of the tire's deflection is attributed to inflation pressure and what part is attributed to the load on the tire. The addition of this information would eliminate the need for the operator of the vehicle to input information on wheel loads into the computer.

The RF receiver 84 mounted in the vehicle will periodically interrogate the RF transmitter 82 in the tire. The revolution count, vehicle speed, and tire deflection data (load and inflation pressure) can them be computed and displayed by an on-board vehicle computer. The computer or microprocessor would control overall performance of the monitoring system and could be programmed with algorithms to take advantage of the revolution count, vehicle speed and tire deflection data including but not limited to:

(A) Filtered individual wheel or average wheel spin velocity;

(B) Individual or average wheel revolution counts over a given period of time; and (C) Filtered individual and average wheel deflection acceptable operating range of wheel deflection for a given wheel angular velocity.

This information can be displayed in the vehicle cabin for the driver's immediate use, or as a warning in the case of a low pressure, high load and high speed situations, or as an input into a vehicle central tire inflation system (CTIS) 90.

Since the tire monitoring system circuitry would contain each tires unique identification number permanently stored in read only memory (ROM) 65, the in-cab microprocessor system or computer could download individual tire data to another external computer for fleet-wide tracking of tire usage.

The preferred embodiment of this invention has been described using specific terms, such description is for illustrative purposes only, and it is to be understood that changes and variations may be made without departing from the spirit of scope of the following claims.

What is claimed is:

1. In a tire mounted on a wheel of a vehicle having a tread portion that contacts a ground surface over a tread contact surface during rolling of the tire under nominal operating conditions of vehicle load and speed, a tire monitoring system comprising:

a reference point on said tread contact surface of said tread portion defining a circumferential location on said tread portion;

a sensor device located within said tire associated with said reference point for generating first electrical signals when said reference point is included within said tread contact length and for generating second electrical signals when said reference point is not within said tread contact length;

an electronics package removed from said sensor device within said tire for energizing said sensor device and for receiving said first and said second electrical signals from said sensor device;

a digital monitoring device of said electronics package for interrogating said first and second electrical signals at a sampling frequency sufficient to obtain a first plurality of electrical pulses each revolution cycle of said tire and a second plurality of digital pulses each revolution cycle of the tire corresponding to said first and second electrical signals respectfully;

a digital logic circuit of said electronics package for determining a sum of the number of said first and second electrical pulses and an ratio of the number of said first electrical pulses to the number of said second electrical pulses each revolution cycle of the tire;

a memory device of said electronics package for storing said sum of electrical pulses and said ratio of said electrical pulses;

an operator display device for an operator of said vehicle to monitor performance of said tire;

digitized transceiver devices for transmitting and receiving a plurality of said sum values and a plurality of said ratio values, corresponding to a tire monitoring time, from said memory device of said tire to said operator display device of said vehicle; and an on-board computer associated with said operator display device for calculating and displaying at least tire deflection values using said plurality of ratio values, wherein said tire can be monitored for proper inflation pressures to provide a predetermined tire deflection.

2. The system set forth in claim 1, wherein said monitoring time for monitoring said tire is at most equal to ten seconds, wherein a predetermined time gap is provided before said monitoring time is repeated.

3. The system set forth in claim 1, wherein said sampling frequency has a value between about 3,000 times per second to about 10,000 times per second.

4. The system set forth in claim 1, wherein said on-board computer further computes and displays a speed of the vehicle using said plurality of sum values to obtain the number of tire revolutions over said monitoring time, wherein said tire can be further monitored to obtain an improved tire deflection consistent with a life cycle performance of said tire.

5. The system set forth in claim 4, including a central tire inflation system for adjusting said tire inflation and thereby adjusting said tire deflection, whereby a relative magnitude of said speed of the vehicle, defined by the same number of tire revolutions in said monitoring time at the adjusted tire deflection, is controlled.

6. The system set forth in claim 1, wherein said digitized transceiver devices further include:

a transmitter device of said electronics package for electronically transmitting a plurality of said sum and said ratio values of said memory device; and a receiver device of said display device for electronically receiving said plurality of said sum and said ratio values.

7. The system set forth in claim 6, wherein said transmitter device and said receiver device comprise radio frequency (RF) devices to essentially transfer at least said ratio and said sum values from said electrical package of said tire to said display device of said vehicle.

8. The system set forth in claim 6, wherein said transmitter device has an interface with said receiver device comprising a slip ring assembly for the transfer of at least said sum and said ratio values from said electronics package of said tire to said display package of said vehicle.

9. The system set forth in claim 1, wherein said sensor device includes a piezoelectric polymer comprising a piece of a polymer which was manufactured to contain aligned dipolar molecules which produce said electrical signals when said polymer is strained.

10. The system set forth in claim 1, including a frequency processing circuit portion of the electronics package for providing a characteristic frequency of the tire used for determining what portion of said predetermined tire deflection is the result of said vehicle load.

11. A method for monitoring a tire mounted on a wheel of a vehicle having a tread portion that contacts a ground surface over a tread contact surface during rolling of the tire under nominal operating conditions of vehicle load and speed, said method comprising the steps of:

establishing a reference point on said tread contact surface which contacts a ground surface each revolution of said tire;

providing a sensor device within said tire associated with said reference point for generating electrical signals;

generating first electrical signals using said sensor device when said reference point is contacting said ground surface over a contact length;

generating second electrical signals using said sensor device when said reference point is not within said contact length;

providing an electrical package remote from said sensor device within said tire for energizing said sensor device and for receiving said first and second electrical signals from said sensor device;

interrogating said first and second electrical signals at a predetermined sampling frequency over a monitoring time using a digital monitoring device of said electrical package;

generating first and second electrical pulses from said digital monitoring device corresponding to said first and second electrical signals respectfully;

providing a digital counting logic circuit of said electrical package for generating the number of first and second electrical pulses respectively each revolution of the said tire using said sampling frequency;

determining a sum of the number of first and second electrical clock pulses each revolution of the tire using said logic circuit;

determining a ratio of the number of first electrical pulses to the number of second electrical pulses each revolution of the tire using said logic circuit;

storing said sum and said ratio in a pulse memory portion of said electronics package for each revolution of the tire;

transmitting a plurality of said sum and said ratio values for a plurality of revolutions, consistent with said tire monitoring time from said pulse memory portion to a receiver portion of an operator display device of said vehicle;

providing an on-board computer associated with said operator display device for calculating and displaying at least tire deflection values using said plurality of ratio values; and monitoring said tire deflection values using said operator display device and adjusting tire inflation pressure values for obtaining a predetermined tire deflection value.

12. The method set forth in claim 11, further including the steps of:

calculating and displaying vehicle speed values using said plurality of sum values over said monitoring time; and monitoring said vehicle speed values for adjusting tire inflation values for obtaining an improved tire deflection value consistent with a speed of said vehicle.

13. The method set forth in claim 11, including the steps of:

providing a central tire inflation system for changing said tire deflection; and controlling at least a relative magnitude of a speed of the vehicle to the number of tire revolutions in said monitoring time.

14. The method set forth in claim 11, including the step of establishing said sampling frequency to have a value between about 3,000 times per second to about 10,000 times per second.

15. The method set forth in claim 11, wherein the step of interrogating said first and second electrical signals includes:

monitoring said tire during said monitoring time not to exceed ten seconds; and repeating said monitoring step after a predetermined time gap.

16. The method set forth in claim 11, wherein said method includes the steps of:

processing said first and second electrical signals using a frequency processing circuit of said electronics package to determine a characteristic frequency of the tire; and calculating a load on a respective tire using said on-board computer and said at least tire deflection values.

17. The method set forth in claim 11, wherein said method includes the steps of:

processing said first and said second electrical signals using a frequency processing circuit of said electronics package to determine a characteristic time period of the tire; and calculating the evolution of a respective tire in terms of said characteristic period of time to determine the tire's wear.

* * * * *